United States Patent [19]

Cole, Jr.

[11] 4,315,244

[45] Feb. 9, 1982

[54] VEHICLE ALARMS

[76] Inventor: Loren F. Cole, Jr., 5310 NE. 67th St., Seattle, Wash. 98115

[21] Appl. No.: 67,215

[22] Filed: Aug. 17, 1979

[51] Int. Cl.³ .............................................. B60R 25/10

[52] U.S. Cl. .................................. 340/63; 200/61.93; 307/10 AT; 340/568

[58] Field of Search ................. 340/63, 541, 546, 568, 340/65; 307/10 AT; 200/61.93; 116/33, 35 R

[56] References Cited

U.S. PATENT DOCUMENTS

| | | | |
|---|---|---|---|
| 1,009,285 | 11/1911 | Crowley | 340/546 X |
| 1,307,575 | 6/1919 | Beall | 340/63 |
| 1,747,194 | 2/1930 | Thomas | 200/61.93 X |
| 1,815,206 | 7/1931 | Mathews | 340/63 |
| 2,908,899 | 10/1959 | Crafts | 340/568 |
| 3,422,398 | 1/1969 | Rubin | 340/63 |
| 3,427,608 | 2/1969 | Green | 200/61.93 X |
| 3,975,645 | 8/1976 | Morar | 340/63 X |

Primary Examiner—John W. Caldwell, Sr.
Assistant Examiner—Joseph E. Nowicki

[57] ABSTRACT

This invention relates to an automatic alarm system for the discouragement of theft or unauthorized tampering with a so equipped motorcycle or other vehicle. This device consists of the motorcycle or vehicle's horn, lights, a source of electrical power (such as the vehicle's battery), an activating or "on" switch, a short circuit preventing fuse, an alarm limiting timer, and a circuit breaking triggering device held open by a non-conducting element of the motorcycle or vehicle which must be moved outside of the circuit breaking triggering device if the motorcycle or vehicle or its equipment is stolen or tampered with. A transmitter of limited range may be incorporated within the activated circuit for broadcasting a tone of identifiable character to interested persons should the circuit breaking triggering device be activated.

1 Claim, 5 Drawing Figures

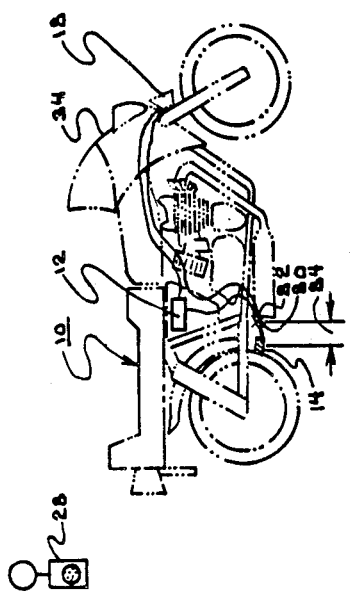
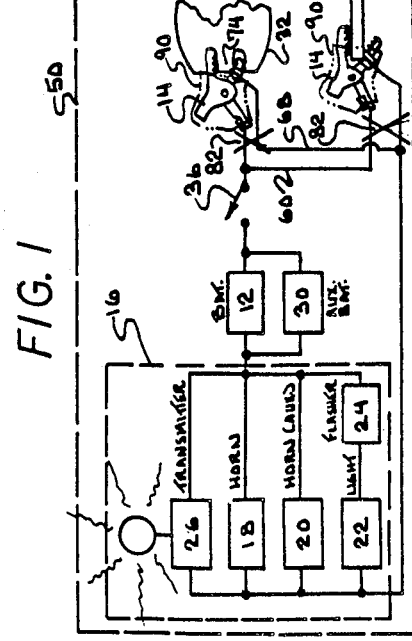

VEHICLE ALARMS

BACKGROUND OF THE INVENTION

1. Field of the Invention

This invention relates to motorcycles and the positioning of an alarm system thereon.

2. Background of Related Art

Motor vehicles, and in particular motorcycles, are the most common subject of tampering and outright theft by parties preying on private property. Various devices have been created to alert the vehicle's owner if their vehicle or equipment is being tampered with or stolen. In large measures, these devices have been complicated, expensive to install, and susceptible to being triggered by small animals, such as birds and cats, and weather conditions, such as rain, wind, and low temperatures. The subject invention deals primarily with the motorcycle industry, although is not limited solely thereto as the heretofore description will illuminate, and in particular to the monitoring of movement of key non-conductive surfaces on the motorcycle for purposes of detecting intent of motorcycle theft, or of the taking of accessory equipment from the motorcycle.

In the main, prior "anti-theft" motorcycle devices consisted of movement sensing sensors (Barnett, U.S. Pat. No. 3,699,515) for the detection of tampering through monitoring accellerations, and of sensing change in the motorcycle's level of tilt as it would remain at rest on its stand. Tilt measurement change would rely primarily on a single mercury switch (Buel, U.S. Pat. Nos. 3,673,562; DeMeter, 3,916,377; Giacino, 4,006,452) for recovery along a single plane, or on coplanar mounted double mercury switches (Horn et al., 3,728,675) for detection of recovery from a tilted stand position, or if they fall below the prescribed level of tilt. (The motorcycle is knocked down or pushed away at a low angle.) A third class of detection device involves monitoring electric field dissipation from the vehicle as a charged body, but because of its complication and obvious environmental complications, as well as its dissimilarity from the subject invention, will hitherto not draw further attention along with its closely allied counterparts.

Accellerometer type devices (such as Barnett, U.S. Pat. No. 3,699,515) are sensitive to adjustment and are easily set off by wind buffetting, passing heavy vehicles, small playing animals, and other "false alarms." Tilt-measurement type devices (such as Buel, DeMeter, Giacino and Horn) measure deviation from a given plane established when the motorcycle is at rest. The adjustment must be precise to be effective. Because of this precision requirement, they are also subject to "false alarms" by wind buffetting and bumping by small animals. Also, many motorcycles have both a "side-stand" on which the motorcycle rests at an angle, and "center-stand" which allows the motorcycle to be pulled up into a supported vertical position. Adjustment of the tilt measurement device on any one of the stands would negate its usefulness, without readjustment, if the other stand would be used. Also, none of the above alarms address the problem of accessory protection, e.g., alarming when equipment or parts are stolen off of the motorcycle. Green (U.S. Pat. No. 3,427,608) discusses a "portable burglar alarm" utilizing a switch with inwardly directed contractor spring arms. The invention relates to home security, and the switch arms are held apart by an insulating wedge that is pulled out by a tether when a door to which it is attached is opened. Both construction and function are different in the subject invention as hereinafter disclosed. The foregoing invention addresses these and other problems, as shall be evident in the description that follows.

OBJECTS AND ADVANTAGES

It is an object of the invention to provide an alarm system with high immunity to false alarms caused by wind, rain, cold and other weather elements.

It is an object of the invention to provide an alarm system that is useful regardless as to how the motorcycle, vehicle, or other object is stand mounted, supported or stored.

It is an object of the invention to provide an alarm system that is useful in protecting select accessories and/or parts and components as well as the motorcycle, vehicle or other object as well.

It is an object of the invention to provide an alarm system that is useful in protecting the motorcycle, vehicle or subject from unauthorized tampering.

It is a further object of the invention to provide an alarm system which is easily concealed from the view of a would-be thief.

It is a further object of the invention to provide an alarm which, because of its conceilment, has a high surprise factor to a thief or tamperer.

And, it is a further object of the invention to be easily installed, simple to maintain and be of low first cost.

These and other objects and advantages will become subsequently apparent reside in the details of construction and operation as more fully hereinafter described and claimed, reference being had to the accompanying drawings forming a part hereof, wherein like numerals refer to like parts throughout.

THE DRAWINGS

FIG. 1 is a profile view of a motorcycle on which the subject invention is installed, and the member to be monitored is the rear wheel.

FIG. 2 is a block system diagram showing the relationship of the various invention elements.

FIG. 3 is a schematic diagram of a simplified frame ground system using the subject invention.

FIG. 4 is a schematic diagram of a simplified harness ground system using the subject invention in which the motorcycle normal wiring harness to the horn (or other devices) is disengaged by switch 36' when subject invention is engaged.

FIG. 5 is a profile view of the Cole Activator, or electrically conductive grasping device, which is the triggering device of the system.

SPECIFIC DESCRIPTION OF THE INVENTION

Now with reference to the drawings, a motorcycle 10 having the invention, warning system 50, contained hereon is installed between the motorcycle 10's battery 12 on one potential side and the motorcycle battery 12's oppositely charged side, thereby affecting or breaking the complete flow of charge from opposing poles of the battery 12. In series with the invention 14, or Cole Activator 14, are warning devices 16, each one so constructed as to make apparent to the public and/or the vehicle owner that the motorcycle or vehicle is being stolen or by ill authority tampered with. These devices are known in the art, and are purchaseable as "modules" to be incorporated in an original equipment manufacturer's design, or by a private consumer who may have gained access to a Cole Activator 14. Normally, these devices are wired in parallel, and have the proper flow of current to complete the circuit to the battery dependent on activator 14. Warning devices as used in the invention to make tampering known are the vehicle's horn 18, a noise emitting horn or device 20 for activation even if the vehicle's main horn 18 is damaged or cut from the circuit, the vehicle's headlight 22 or lights which may be turned on and off in a repetitive and attention drawing manner by a known flasher means 24. Such flashers 24 are generally mechanical or electronic "flip-flops." A further warning device for the vehicle owner, to aid him or her when they are outside of sight of the vehicle, would be a frequency modulated transmitter 26 operating at low power and at a fixed frequency and carrying thereon a translateable audible tone or rhythm which is clearly understood by the owner carrying a receiver 28 to belong to the vehicle. Again, all warning devices 16 are inoperable unless activator 14 allows current to flow. To negate the potential of a would-be thief disabling the device by cutting the vehicle battery from the circuit, an auxiliary battery 30 is placed in parallel therein. Also, a mechanical or electronic timer may be incorporated in series with the circuit to automatically turn off the warning devices 16 after, say, two or greater minutes to conserve vehicle battery power. Also, a fuse 29 or circuit breaker 29 is incorporated to protect the circuit. This circuit breaker 29 may be of the "tripping" type and, by carefully controlling the power into the circuit breaker 29, the circuit breaker will "blow" at a controlled time due to heat or power saturation and thereby serve a protective and timing function.

The activator 14 is placed, as aforementioned, in series with the circuit and dictates the logic by which it operates. When the Cole Activator 14 is singly in the circuit, or a number of them are placed in parallel, triggering any of the activators 14 by removing the non-conducting object it is clamped to will cause alarms or warning devices 16 to be energized. Placing activators 14, e.g., more than one, in series creates "and" logic and the system to be triggered only if all activators 14 are triggered.

The invention, as hereinunto described, consists of an energizing power source, such as the battery 12 and auxiliary battery 30, in circuit with warning devices 16, and the activator 14. These elements are contained in parallel with the motorcycle 10 or vehicle's normal electrical circuitry. The enabling or dissabling of the invention, or warning system 50, is activated by placing the activator 14 on an insulating, normally moving or stolen element on the motorcycle or vehicle, such as the moving tire tread 32 and accessories on the motorcycle such as the wind fairing 34, helmet and garments placed on the vehicle. The warning system 50 is then enabled by closing switch 36 and allowing a full conductive path up to the activator 14.

Activator 14 is composed of a spring loaded grasping means 52, such as an alligator clip or clothes pin as commonly found in the electronic or household art. Grasping means 52 is held closed by a spring 54 such as to insure a strong and secure grip on objects which it is placed. Teeth 56 and 56' are in the outwardly cantilevered jaws 58 and (the lower jaw) 58'. In a common all metal alligator clip 52, one wire or pole 60 of the electric circuit of alarm system 50 is attached onto the clip 52 by mechanical means such as a screw 62, or may be wire wrapped, soldered, or attached conductively by any means known in the art. The lower jaw 58' (or the upper jaw 58 alternatively) is banded by an insulating jacket 64 suitable to prevent the flow of electric current therethrough. A conducting metal band 66 is then wrapped about the insulating jacket 64. Insulating jacket can be made of rubber or suitable plastic material. To conducting metal band 66 is attached to the opposite wire or pole 68 of the circuit of alarm system 50 by soldering, wire wrapping or other solid and conductive known means. Metal band 66 is of suitable thickness to pass alarm system 50's current without heating. Band 66 has a broad, flat contacting and conducting surface 70. Surface 70 when lower jaw 58' and upper jaw 58 come together to its fullest extent, comes into contact with a substantially notched, flat and conductive surface 72, and in so doing makes a complete electric circuit. Placing of a non-conductive element, such as the rib or a piece of tread 74 of tire 32 opens the circuit of alarm 50 and prevents activation of activating devices 16. Activator 14 is held to a fixed point on the frame 80 of the motorcycle 10, by a tie 82. Wires 60 and 68, passing through 82, have a length 84 free, preferably $\frac{1}{2}''$ or greater, about which the Cole Activator 14 is allowed to rotate. This free roatating length 84 allows the monitored member, such as tire rib 74, to move slightly without triggering the alarm system 50, and thereby prevent false alarming unless the motorcycle or vehicle is grossly moved. Gross movement will, of course, pull tire rib 74 from jaws 58 and 58', and spring 54 would thence force surface 70 into contact with surface 72, completing the circuit and triggering the alarm. Of course, metal conducting members may be used therein in place of rib 74 provided they shall be rendered nonconductive by plastic tape or other means. The alarm system 50 can then only be disabled readily by disabling or turning off the hidden switch 36, or by replacing hidden activator 14. Of course, a latching circuit, such as a latching relay, may be placed in the circuit, thereby causing the circuit to stay activated even if activator 14 is replaced. A non-conductive shield 90, of a material such as rubber or other elastomer, preferable black in color, is placed thereon the Cole Activator 14 for purposes of dirt exclusion, insulating said activator against accidental shorting or grounding against frame, and for conceiling the presence of the Cole Activator 14 from intrusion therein.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim is as follows:

1. An alarm circut for alerting the user and others to the in-process theft of a motorcycle, said alarm comprising:
    a battery for supplying current in the alarm circut; and alarming means powered by said battery and controlled by an alarm circut switch for notifying the user and others of an in-process motorcycle theft;
    said alarm circut switch for attachment to a tire of said motorcycle, said circut switch having a first electrically conductive jaw which is spring biased to close upon a second jaw in response to rotation of said tire due to in-process motorcycle theft and;

a first wire fixed to said second jaw such that the closing of said electrically conductive first jaw upon said second jaw causes an electrically conductive pathway to be created through said first jaw and said first wire;

a second wire fixed to said electrically conductive first jaw such that a closing of said first jaw upon said second jaw causes an electrically conductive pathway to be created through said second wire, first jaw and thence through said first wire such that when said first and second jaws are closed the alarm circut switch is closed and the alarming means is empowered by the battery and when said first and second jaws of said switch are grasping the tire of said motorcycle and the tread is interposed between said first and second jaw, the alarm circut remains open;

an extension of said first and second wires from said respective second and first jaws to an anchoring means on said motorcycle frame with the length of said extension permitting a limit but definite movement of the motorcycle prior to detachment of said alarm circut switch and a closing of said alarm circut switch.

* * * * *